US009205596B2

(12) United States Patent
Short

(10) Patent No.: US 9,205,596 B2
(45) Date of Patent: *Dec. 8, 2015

(54) ULTRASONIC SONOTRODE FOR TRANSVERSELY ALIGNED TRANSDUCER

(71) Applicant: Frito-Lay North America, Inc., Plano, TX (US)

(72) Inventor: Matthew A. Short, Wilmington, OH (US)

(73) Assignee: FRITO-LAY NORTH AMERICA, INC., Plano, TX (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/166,036

(22) Filed: Jan. 28, 2014

(65) Prior Publication Data

US 2015/0210002 A1 Jul. 30, 2015

(51) Int. Cl.
*B32B 37/00* (2006.01)
*B29C 65/08* (2006.01)
*B23K 20/10* (2006.01)
*H01P 11/00* (2006.01)

(52) U.S. Cl.
CPC .............. *B29C 65/08* (2013.01); *B23K 20/106* (2013.01); *H01P 11/007* (2013.01)

(58) Field of Classification Search
CPC ............ B06B 3/00; B06B 3/04; B29C 65/08; B29C 65/081; B29C 65/087; B65B 51/225; B23K 20/106
USPC ................................... 156/73.1, 580.1, 580.2
See application file for complete search history.

(56) References Cited

U.S. PATENT DOCUMENTS

| | | | |
|---|---|---|---|
| 3,696,259 A | 10/1972 | Mori et al. | |
| 5,096,532 A | 3/1992 | Neuwirth et al. | |
| 8,028,503 B2 | 10/2011 | Capodieci | |
| 8,082,966 B2 | 12/2011 | Short | |
| 8,272,424 B2 | 9/2012 | Short | |
| 8,887,784 B2 * | 11/2014 | Thaerigen | 156/580.2 |
| 2004/0112547 A1 | 6/2004 | Tamamoto | |
| 2012/0012258 A1 | 1/2012 | Vogler | |
| 2013/0213580 A1 | 8/2013 | Thaerigen | |

OTHER PUBLICATIONS

PCT International Search Report and Written Opinion from PCT/US2015/013085 mailed May 4, 2015 (9 pages).

* cited by examiner

*Primary Examiner* — James Sells
(74) *Attorney, Agent, or Firm* — Colin P. Cahoon; James H. Ortega; Carstens & Cahoon, LLP

(57) ABSTRACT

For use with the technique of transversely aligning the transducer in an ultrasonic welding assembly, the presently disclosed principles provide a unique ultrasonic sonotrode for use in ultrasonic welding assemblies having such a transversely aligned transducer. In one embodiment, an exemplary ultrasonic sonotrode comprises a body having nodal and antinodal regions, and configured to propagate ultrasonic waves received at a nodal region along a first direction. Such an exemplary sonotrode may further comprise a plurality of redirecting features formed in the body and configured to cause received ultrasonic waves propagating along the first direction to propagate along a second direction, perpendicular to the first direction, upon encountering one or more of the redirecting features. In such embodiments, the body is further configured to stretch and compress along the second direction based on corresponding peaks and valleys of the waves propagating along the second direction. Such a sonotrode may also include at least one ultrasonic welding surface at an antinodal region of the body configured to oscillate based on the stretching and compressing.

20 Claims, 5 Drawing Sheets

ULTRASONIC SONOTRODE FOR TRANSVERSELY ALIGNED TRANSDUCER

BACKGROUND OF THE INVENTION

1. Technical Field

The present invention relates to ultrasonic welding. More specifically, the invention disclosed herein pertains to an ultrasonic sonotrode configured for use with a transversely aligned transducer in an ultrasonic welding assembly.

2. Description of Related Art

Ultrasonic welding is a technique employed for joining thin, malleable materials, such as thermoplastics and even soft metals like aluminum and copper. In industry, ultrasonic welding is a good automated alternative to glues, screws or snap-fit technologies typically used to join materials. The benefits of ultrasonic welding are that it is much faster than conventional adhesives or solvents. The drying time is very quick, and the pieces do not need to remain in a jig for long periods of time waiting for the joint to dry or cure. The ultrasonic welding process can easily be automated, making clean and precise joints that rarely require any touch-up work. The low thermal impact on the materials involved enables a greater number of materials to be welded together, as well. Moreover, because no glues or other additives are employed during the process, ultrasonic welding is a great choice for food-based package welding, such as plastic or aluminum bags like the kinds employed for chips and other snacks.

During the ultrasonic welding process, parts are laid together between a fixed shaped nest (called an "anvil") and a sonotrode (called a "horn"). The sonotrode is connected to a transducer, which is used to convert electrical energy into acoustic vibrations. Such low-amplitude acoustic vibration is emitted from the sonotrode and into the materials being welded at the intended joint location. Typical frequencies used in ultrasonic welding range from 15 kHz to 40 kHz, but sometimes may even be found as high as 70 kHz. The ultrasonic energy melts the point of contact between the parts, creating the joint. Ultrasonic welding works by causing local melting of the material(s) due to absorption of vibration energy which are introduced across the joint to be welded. To ensure the welding joint is in the desired location, and is of the proper size, the interface of the two materials may be specially designed to concentrate the melting (welding) process. Although some heating in the joint area does occur, it is usually not enough to melt the materials, and instead it is the vibrations introduced along the joint being welded that causes the materials to weld together.

The applications of ultrasonic welding are extensive and are found in many industries, including electrical, computer, automotive, aerospace, medical, and packaging. Whether two items can be ultrasonically welded is determined by their thickness. Accordingly, if the materials are too thick, the ultrasonic welding process will not join them. Advantageously, the ultrasonic welding process is very fast and easily automated, with weld times often below one second. Also, there is no ventilation system required to remove heat or exhaust, which also helps reduce overall manufacturing costs. In addition, ultrasonic welding is excellent for assemblies that are typically too small, too complex, or too delicate or dangerous for more common welding techniques.

The food industry finds ultrasonic welding preferable to traditional joining techniques because it is fast, sanitary, and can produce hermetic seals. An exemplary conventional ultrasonic welding assembly 100 is illustrated in FIG. 1. In this conventional assembly 100, an ultrasonic sonotrode 110 is included to provide the acoustic vibrations for ultrasonic welding. The acoustic vibrations are introduced to the sonotrode 110 using an ultrasonic transducer 120, and are propagated along the longitudinal axis $L_1$ of the assembly 100. As mentioned above, the ultrasonic transducer 120 converts an electrical input 125 into acoustic waves, and the acoustic waves may then be amplified using a booster 130. The ultrasonic sonotrode 110 includes a welding region 115, which in this example is a welding edge 115, that contacts a material 140 to be ultrasonically welded while the acoustic vibrations are propagating through the sonotrode 110 towards the welding edge 115.

To ultrasonically weld the material 140, the sonotrode 110 oscillates from the acoustic waves propagating therethrough while the welding edge 115 is moved to contact the material 140 and compress it against an anvil 150. As illustrated, in conventional assemblies 100 the transducer 120, booster 130, and direction for welding using the welding edge 115 of the sonotrode 110 are in-line with the longitudinal axis $L_1$, and therefore the acoustic waves propagate along a single axis $L_1$ throughout the entire assembly 100. The oscillation of the welding edge 115 onto the material 140 while pressing the material 140 against the anvil 150 causes the material 140 to be ultrasonically welded.

Unfortunately, because the transducer 120 and the welding edge 115 are positioned along a single longitudinal axis $L_1$, premature failure of the ultrasonic welding assembly 100 may occur. More specifically, since the oscillating welding edge 115 is pressed against the anvil 150 (with the material 140 therebetween) during ultrasonic welding, vibrational feedback caused from the physical contact of the oscillating sonotrode 110, material 140, and anvil 150 propagates back through the sonotrode 110, through the booster 130, and finally back into the transducer 120. The vibrations fed back into the transducer 120 consistently leads to premature transducer 120 failure. In addition, the linear arrangement of conventional ultrasonic assemblies occupies a large amount of space within an ultrasonic welding apparatus. Moreover, such a linear arrangement requires the assembly 100 to move towards and away from the anvil 150 for each incidence of ultrasonic welding of the material 140. Such movement is not only time consuming, but also requires additional machinery and energy for repeatedly moving the assembly 100 back and forth for each welding operation. Such additional equipment and energy also results in increased costs and the potential equipment failure in such conventional approaches. In view of such deficiencies, there exists a need in the art for an improved ultrasonic welding apparatus and method that does not suffer from the deficiencies found in conventional ultrasonic assemblies.

SUMMARY OF THE INVENTION

An object of the disclosed principles is to circumvent potential issues resulting in cracked or damaged sonotrode horns and transducers, non-uniform displacement, or system resonance when a sonotrode assembly is subjected to rigorous work conditions. In co-pending U.S. patent application Ser. No. 14/166,081, entitled "Transverse Sonotrode Design for Ultrasonic Welding" and filed Jan. 28, 2014, which is commonly assigned with the present disclosure and incorporated herein by reference, introduces the novel technique of "decoupling" one or more transducers in an ultrasonic assembly from the direction of working displacement, and driving the welding assembly at the nodal region of the sonotrode, rather than the anti-nodal regions, to take advantage of the Poisson Effect. As discussed above, in applications requiring high force or high amplitude, an ultrasonic transducer can see significant stress due to start-up while under load, i.e., making physical contact with an anvil or other tooling. Such mechanical impacts typically generate reflecting waves back into the transducer which results in an electrical shock to the assembly and system eventually leading to catastrophic failure. By transversely aligning the transducer(s) as disclosed in this co-pending application, an ultrasonic welding assembly is no longer subjected to damaging feedback occurring from delivering ultrasonic energy to a work piece or material because of the transverse mounting arrangement provided by the disclosed principles.

For use with the technique of transversely aligning the transducer in an ultrasonic welding assembly, the presently disclosed principles provide a unique ultrasonic sonotrode for use in ultrasonic welding assemblies having such a transversely aligned transducer. In one embodiment, an exemplary ultrasonic sonotrode comprises a body having nodal and anti-nodal regions, and configured to propagate ultrasonic waves received at a nodal region along a first direction. Such an exemplary sonotrode may further comprise a plurality of redirecting features formed in the body and configured to cause received ultrasonic waves propagating along the first direction to propagate along a second direction, perpendicular to the first direction, upon encountering one or more of the redirecting features. In such embodiments, the body is further configured to stretch and compress along the second direction based on corresponding peaks and valleys of the waves propagating along the second direction. Such a sonotrode may also include at least one ultrasonic welding surface at an anti-nodal region of the body configured to oscillate based on the stretching and compressing.

In some embodiments, an ultrasonic sonotrode as disclosed herein may further include a body comprising an elongated structure having anti-nodal regions along long sides, and nodal regions along short sides, of the elongated structure. Also in some embodiments, opposing ends of the sonotrode comprise the nodal region, at least one of the opposing ends configured to receive the ultrasonic waves. In related embodiments, the redirecting features comprise elongated slots formed through the body and extending along the second direction. In such embodiments, the elongated slots may be substantially equally spaced across the body. In some embodiments, the elongated slots each comprise substantially equal widths along each slot length. Moreover, in some embodiments, the elongated slots comprise varying lengths. Still further, in some related embodiments, the length of elongated slots closer to the ends of the body are greater than lengths of elongated slots further from the ends of the body.

In some embodiments, a thickness of the body is tapered along the second direction from a center portion of the body, extending along the first direction, to edges of the body. In some related embodiments, the edges of the body each comprise anti-nodal regions of the body having substantially uniform thickness along their lengths, at least one of the anti-nodal regions comprising the at least one welding surface. Also, in some exemplary embodiments, the center portion of body comprises a uniform thickness along the first direction, the tapering extending from the center portion of uniform thickness to the edges.

Other aspects, embodiments and features of the invention will become apparent from the following detailed description of the invention when considered in conjunction with the accompanying figures. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying figures, wherein:

DETAILED DESCRIPTION

The disclosed principles enhance the weldability of thin materials with ultrasonic systems by incorporating unique ultrasonic welding sonotrode designs and constructions, along with novel methods of manufacturing such unique ultrasonic sonotrodes. The disclosed principles provide sonotrodes that may be employed with a transversely mounted ultrasonic transducer, where such transverse alignment results in decoupling the acoustic wave transmission axis of the transducer from loading conditions found at the welding surface of the assembly. Accordingly, a sonotrode in accordance with the disclosed principles produce oscillations that oscillate transversely to the acoustic waves input to the sonotrode. More specifically, for ultrasonic welding applications, the disclosed principles convert acoustic vibrations introduced from the anti-node of a first waveguide of an ultrasonic assembly (e.g., a booster) and propagating along a first transmission axis, into vibrations propagating within a second waveguide (e.g., a sonotrode) along a second transmission axis perpendicular to the first transmission axis when the node of the second waveguide is coupled to the anti-node of the first waveguide. For ultrasonic welding applications, the disclosed principles provide a sonotrode having a welding surface that is perpendicular to the transmission axis of a transducer/booster assembly by coupling the sonotrode's nodal region to the transducer/booster's anti-nodal region, which is contrary to conventional practice.

Figure 2:
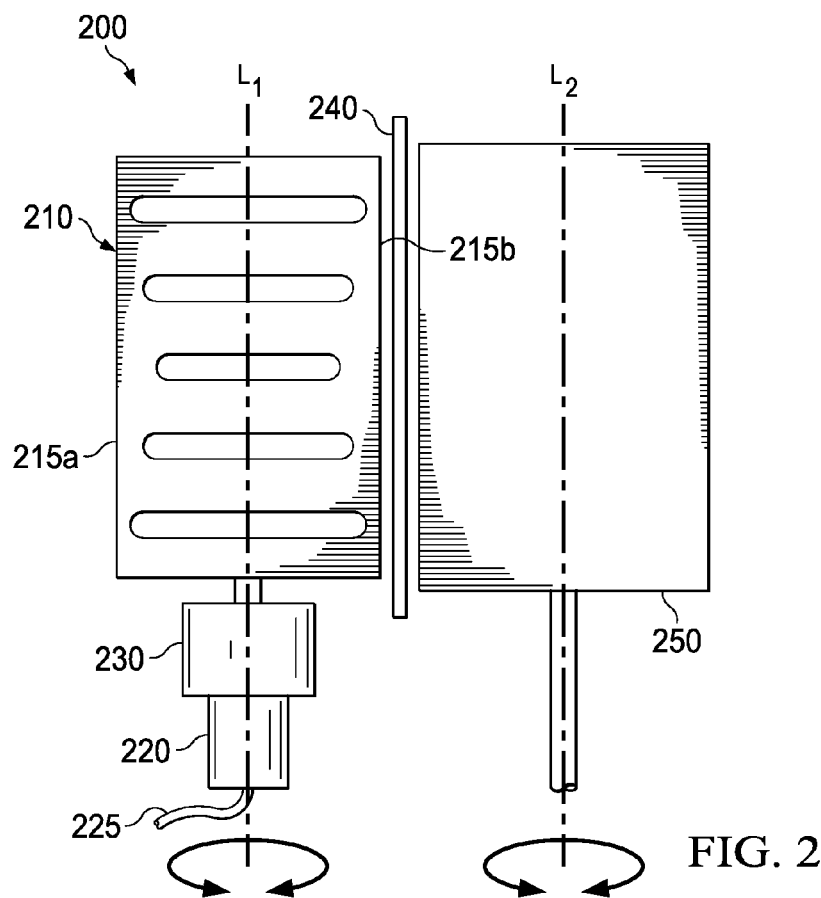
FIG. 2 depicts one embodiment of an ultrasonic welding assembly constructed in accordance with the disclosed principles.

Looking at FIG. 2, illustrated is an ultrasonic assembly 200 having a sonotrode constructed in accordance with the disclosed principles. The disclosed assembly 200 includes the ultrasonic sonotrode 210 for facilitating ultrasonic welding of a material 240. In this illustrated embodiment, the sonotrode 210 includes two welding regions or surfaces 215a, 215b, which are on opposing sides of the sonotrode 210. Of course, in other embodiments, the sonotrode 210 may include a greater or lesser number of welding regions, as each particular ultrasonic welding application may require.

Figure 1:
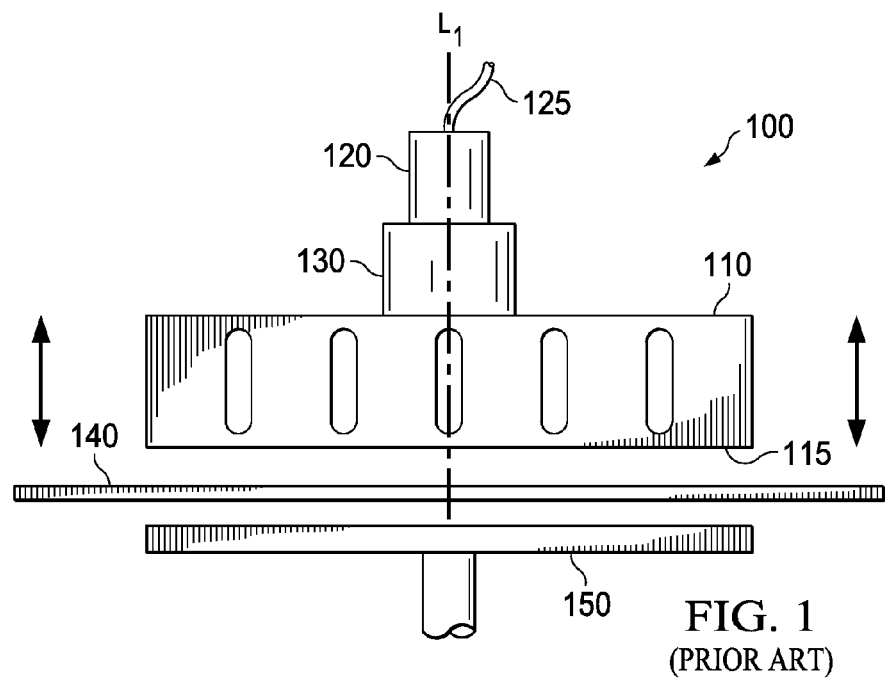
FIG. 1 depicts one embodiment of a conventional ultrasonic welding assembly.

In this illustrated embodiment, the sonotrode 210 is a rotary sonotrode in that it can rotate about its longitudinal axis $L_1$. To ultrasonically weld the material 240, the welding regions 215a, 215b press the material 240 against an anvil 250. In this exemplary rotary embodiment, the anvil 250 may also be rotated about its longitudinal axis $L_2$. More specifically, rather than laterally moving the sonotrode 210 towards and away from the anvil 250 as in the conventional assembly shown in FIG. 1, a rotary assembly can instead simply rotate both the sonotrode 210 and the anvil 250 to grasp the material 240 therebetween to be welded. After the ultrasonic welding occurs, the rotation of the sonotrode 210 and anvil 250 can release the material 240, which can then be advanced so that another area of the material 240 may be placed between the sonotrode 210 and anvil 250 and thus be welded. Of course, the disclosed principles may be applied in a non-rotary welding assembly as well, and no limitation to this exemplary embodiment is intended.

Looking more specifically at how the ultrasonic welding process may occur with the assembly 200 in FIG. 2, the illustrated ultrasonic welding assembly 200 includes an ultrasonic transducer 220 for converting incoming electricity 225 into acoustic vibrations. In exemplary embodiments, the transducer 220 is a high power ultrasonic transducer 220 that may operate between about 15-100 kHz when converting electrical energy into mechanical oscillations (i.e., acoustic vibrations). As the acoustic waves are generated, the waves propagate from the transducer 220 and towards the sonotrode 210 along the longitudinal transmission axis $L_1$. In high power embodiments, the transducer 220 may be powered by a generator capable of driving the system by as much as 10,000 Watts. Of course, other oscillation frequencies and drive power may also be employed with a system or method implemented in accordance with the disclosed principles, and the examples discussed herein should not be read to limit the disclosed principles to any particular embodiments.

Coupled to the transducer 220 is a booster 230, which may be employed to adjust the gain (e.g., amplitude) of the ultrasonic assembly 200. More specifically, the booster 230 is typically a simplified form of sonotrode in which mechanical oscillations are provided (by the transducer) at one anti-node of a material, and are then transmitted through the second anti-node of the material typically with an adjusted amplitude. For example, a typical 20-kHz transducer may have an output of 28 μm peak-to-peak displacement for an acoustic wave. With a 1:1 gain booster, the displacement at the first anti-node (at the input of the booster) will be that 28 μm amplitude, while the displacement at the second anti-node (at the output of the booster) will also be 28 μm amplitude. However, if a 1.5:1 gain booster is employed, the resulting displacement at the booster output will be 42 μm, which is a 1.5× gain over the 28 μm amplitude input to the booster. Conversely, a booster may be employed to reduce the amplitude of the acoustic wave propagating through the material, should the application call for it.

Another purpose of a booster is to provide a means for rigidly holding the transmission line or axis of an ultrasonic sonotrode so that appropriate forces (caused by the oscillations) can be applied for ultrasonic welding applications. In conventional ultrasonic welding assemblies, this is accomplished by creating special geometry around the nodal region of the booster, such that the coupling point theoretically has zero displacement. This approach can be better understood with an understanding of the physical effects on a material caused by the introduction of acoustic waves, which is provided below.

Figure 3:
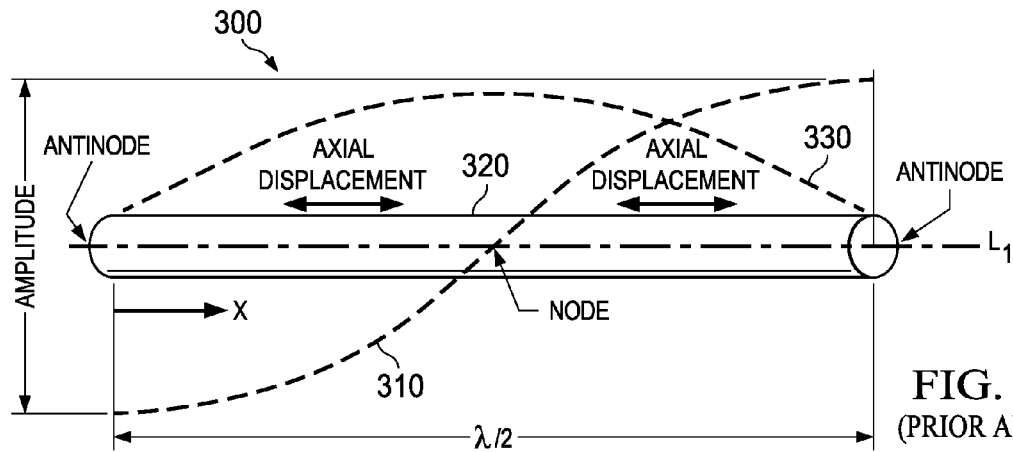
FIG. 3 depicts a diagram of one-half wavelength ($\lambda/2$) of an acoustic vibration oscillating through a material along its longitudinal axis.
Figure 4:
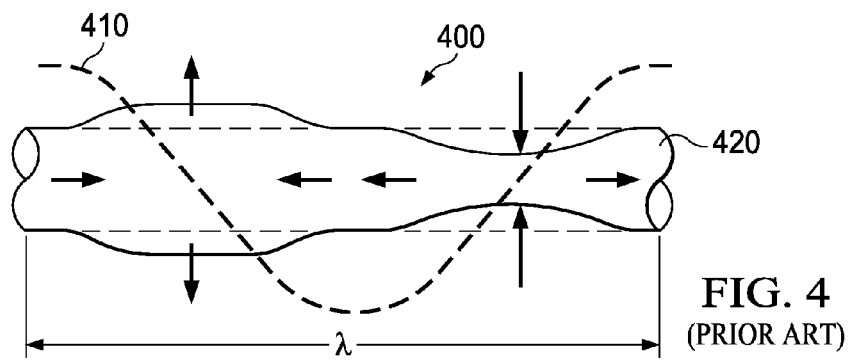
FIG. 4 depicts a diagram of a material undergoing the Poisson Effect during a full wavelength ($\lambda$) of an acoustic oscillation.

Looking briefly to FIG. 3, illustrated is a diagram 300 depicting a one-half wavelength ($\lambda/2$) of an acoustic vibration 310 oscillating through a material 320 along its longitudinal transmission axis $L_1$. The acoustic wave 310 propagates through the material 320 in the X direction where the oscillation of the vibration induces stresses on the material 320 as illustrated by stress curve 330. More specifically, the peaks and valleys of the vibration wave 310 define the anti-node of the material 320, while the transition of the wave 310 occurs at the node of the material 320, theoretically causing zero stress on the material 320 at those anti-nodal regions. As a result, as the acoustic wave 310 propagates through the material 320, a stress compressing and stretching (i.e., axial displacement) the material 320 around the nodal region occurs. This phenomenon is called the "Poisson Effect," which is the compressing and stretching of an elastic solid which results in a bulging and reduction effect around the nodal position of a material. For example, FIG. 4 illustrates a diagram 400 of a material 420 undergoing the Poisson Effect during a full wavelength ($\lambda$) of an acoustic oscillation 410. The peaks and valleys of the wave 410 impart the stretching/compressing stresses on the material 420 as the acoustic wave 410 propagates therethrough. This continuous compressing and stretching provides the drive for a sonotrode in an ultrasonic welding assembly.

Figure 6:
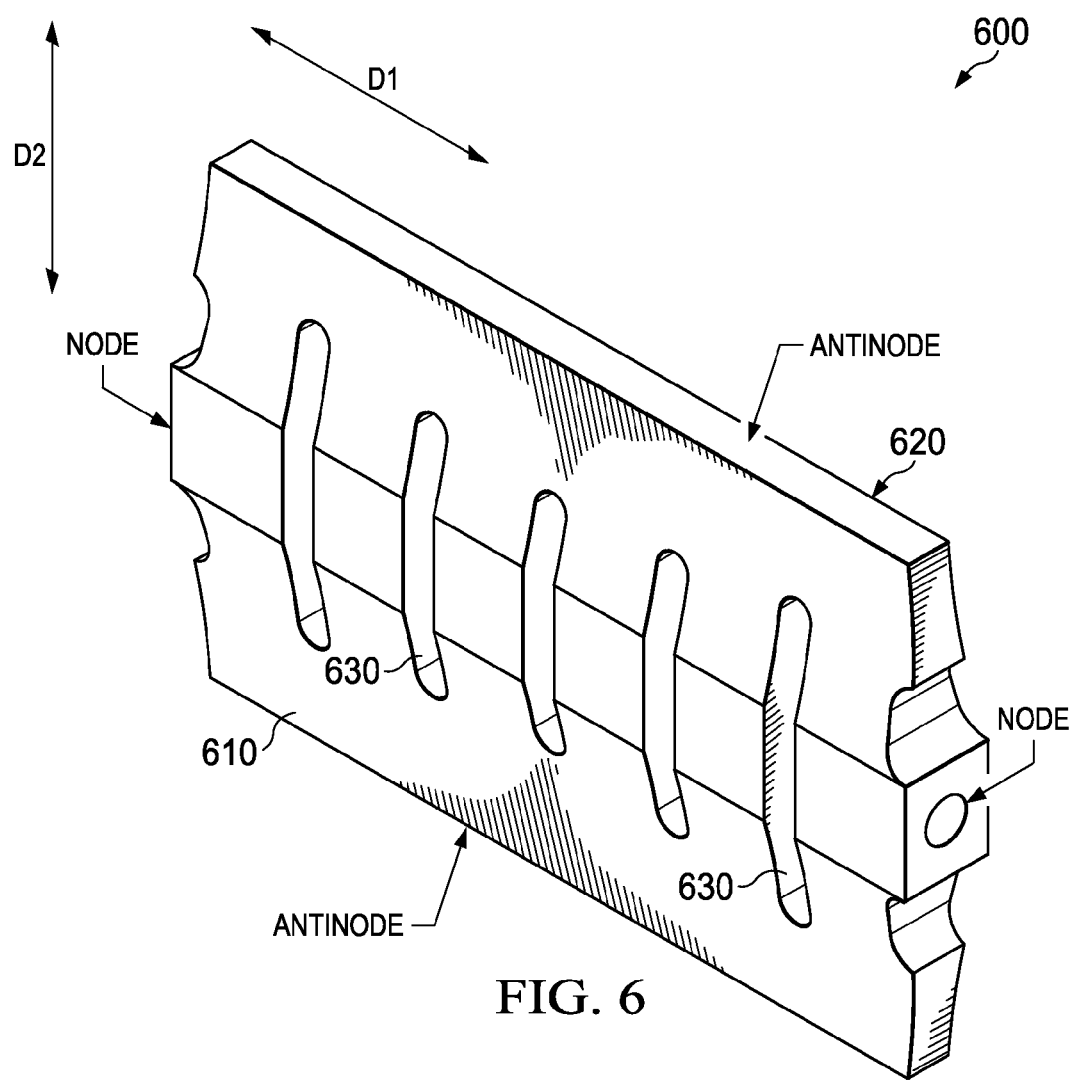
FIG. 6 depicts a perspective view of an ultrasonic welding sonotrode constructed in accordance with the disclosed principles.

Therefore, in conventional ultrasonic welding assemblies, the transmission axis of the sonotrode utilizes the anti-node region as the driving point for maximum displacement of the welding edge. And by extension, a booster, such as a "booster ring," allows one to firmly clamp the transmission line of the components used to provide the acoustic waves to the sonotrode around the nodal region of the booster due to the small levels of vibration produced in a radial manner at that location. As a result, a conventional ultrasonic acoustic wave transmission line typically incorporates multiple half-wave ($\lambda/2$) segments to drive ultrasonic vibrations through all of the components of an ultrasonic welding assembly, including the sonotrode. Thus, the sonotrode in conventional assemblies is coupled to the second (output) anti-node of the booster (via its anti-node, as shown in FIG. 6), and transmits the acoustic wave energy to the opposing anti-node at the welding edge of the sonotrode so that the ultrasonic energy is introduced into the material.

Figure 5:
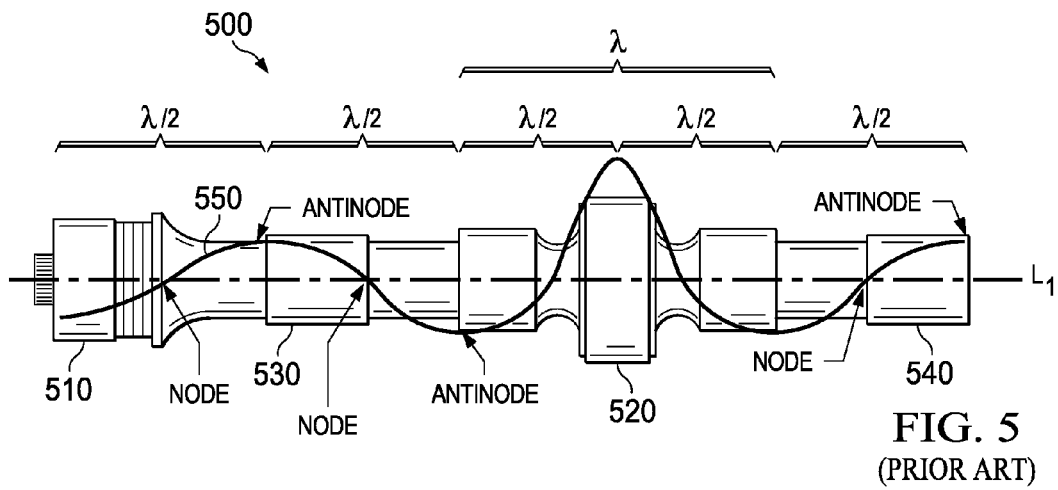
FIG. 5 depicts a side view of a conventional ultrasonic welding assembly having a single acoustic wave transmission line geometry.

FIG. 5 illustrates a side view of a conventional ultrasonic welding assembly 500 having a single acoustic wave transmission axis/line geometry. More specifically, the assembly 500 includes a transducer 510, a booster 520, a transducer interface 530 coupling the transducer 510 and the booster 520, and a sonotrode interface 540 configured to couple the booster 520 to an ultrasonic sonotrode (not illustrated).

As illustrated, the components in the assembly 500 each provide one-half wavelengths of the transmission line. The size and geometry of each component in the assembly 500 is selected based on the application. Thus, acoustic wave component transmission lines can be more complex involving more components, but at half-wave ($\lambda/2$) intervals. Importantly, in this conventional arrangement, the transducer 510 is again coupled to the anti-node of a booster/sonotrode, introducing longitudinal vibrations 550 along the centerline transmission axis $L_1$ of each half-wave ($\lambda/2$) component. The longitudinal vibration 550 is continuously transmitted through each component, ultimately delivering a longitudinal displacement along the single transmission axis $L_1$ at the final anti-node point for delivering ultrasonic energy into the sonotrode, and thus into the work piece or material. Then, in accordance with conventional practice, the assembly 500 is coupled to an ultrasonic sonotrode at the anti-node of sonotrode.

However, in contrast to conventional approaches, the disclosed principles provide a unique sonotrode that is coupled to the anti-node (i.e., output) of the booster at a nodal point rather than at an anti-nodal point of the sonotrode. FIG. 6 illustrates a perspective view of an exemplary ultrasonic sonotrode 600 constructed in accordance with the disclosed principles. The disclosed principles provide a sonotrode for use with the technique of transversely aligning the transducer in an ultrasonic welding or similar assembly.

In the illustrated embodiment, the ultrasonic sonotrode 600 includes a body 610 that has both nodal and anti-nodal regions. The body 610 is constructed of a material that allows for the propagation of acoustic waves through the body 610. For example, the body 610 may be constructed from a metal, such as aluminum or steel, which typically permits easy propagation of ultrasonic waves. Of course, the use of metal for the body 610 is merely exemplary, and thus other beneficial materials either now existing or later developed may also be employed.

As discussed above, objects will typically have nodal and anti-nodal regions, and the reaction at these points of the material comprising the object will react differently in response to waves propagating through the object. When the frequency of the waves passing through the material comprising the object is in resonance with the material, the Poisson Effect will result in the expansion and contraction of the material in resonance with the peaks and valleys of the propagating waves. Accordingly, as discussed above, maximum expansion and contraction will occur at the anti-node of the material during the Poisson Effect. In the sonotrode 600 constructed in accordance with the disclosed principles the anti-node of the sonotrode 600 would therefore comprise the welding surface 620, since that is where maximum oscillations will occur. However, in contrast with conventional sonotrodes, a sonotrode according to the disclosed principles is configured to be coupled to, and thus receive the ultrasonic waves from, the remainder of the ultrasonic welding assembly (not illustrated) at the node of the sonotrode 600.

Importantly, coupling a sonotrode 600 at its node, as opposed to its anti-node, results in the welding surface 620 being perpendicularly aligned with the direction of the incoming waves. As a result, the disclosed principles provide for "redirecting" the propagation direction of the incoming waves so that they are properly propagating towards the anti-node of the sonotrode 600, and thus towards its welding surface(s) 620. FIG. 6 illustrates a first propagation direction of the incoming waves as D1, and illustrates the second propagation direction, which is perpendicular to the first direction, as D2. To create the change in wave propagation from the first direction D1 to the second direction D2, the disclosed principles further provide for a plurality of redirecting features 630 formed in the body 610. The redirecting features 630 are formed along the second direction D2 to cause received ultrasonic waves propagating along the first direction D1 to propagate along a second direction D2 upon encountering one or more of the redirecting features 630.

Depending on the embodiment, the redirecting features 630 may comprise elongated slots 630 formed through the body 610 and extending along the second direction, as depicted in the embodiment of FIG. 6. In such embodiments, the elongated slots 630 may also be substantially equally spaced across the body 610, also as illustrated. However, in other embodiments, the redirecting features may comprise other shapes, and may also be multidirectional rather than linear features. Moreover, in the illustrated embodiment, the elongated slots 630 each comprise substantially equal widths along each slot 630 length; however, the disclosed principles are not so limited. Thus, features of varying widths may also be constructed in the sonotrode 600 so long as the features provided for the redirecting of the incoming waves as discussed herein.

Still further, the elongated slots 630 illustrated in FIG. 6 comprise varying lengths; specifically, the length of elongated slots closer to the ends (nodal regions) of the body 610 are greater than lengths of elongated slots further from the ends of the body 610. Again, however, this is not required. Therefore, the lengths of the slots 630 or other features along the second direction D2, in addition to potential variations in widths and general direction, may be varied as needed. For example, in the illustrated embodiment, the outermost slots are longer than the inner most slots, which results in a sonotrode 600 that provides good redirection of ultrasonic waves that enter the sonotrode 600 from both of its opposing ends (i.e., nodal regions). However, in alternative embodiments, the length of the feature on only one end of a sonotrode as disclosed herein may be longest, while the final feature at the opposing end may be the shortest, which may provide better redirection of waves incoming only from the nodal end having the shortest feature length. Thus, as before, not only may feature shape be selected to most efficiently redirect incoming waves from node to anti-node of a sonotrode, but feature lengths may also be selected as well to increase redirection efficiency.

Therefore, it should be noted that although the illustrated embodiment of the sonotrode 600 is an elongated structure having anti-nodal regions along long sides, and nodal regions along short sides, of the elongated structure, other embodiments of sonotrode according to the disclosed principles may have different or alternative shapes. Moreover, nothing in the principles disclosed herein limits the general shape of the sonotrode to being substantially rectangular. Instead, the disclosed principles provide for any sonotrode shape or composition that provides for incoming ultrasonic waves propagating in one direction to be altered to propagate along a second direction such that the sonotrode may be transversely mounted to the assembly generating and providing the waves. By providing a sonotrode that may be transversely aligned with the wave generation assembly, the disclosed principles use the nodal position of a sonotrode as a driving location for incoming acoustic waves, which is contrary to conventional practices, in order to "decouple" the transducer from the sonotrode by providing transverse transmission axes. Therefore, a longitudinal wave is produced within the sonotrode oscillating transversely to the input displacement provided along the transducer/booster transmission axis. Stated another way, the decoupling of the output transmission direction D2 from the input transmission direction D1 by transversely aligning the sonotrode anti-nodal regions to the input components allows an assembly in accordance with the disclosed principles to avoid the typically destructive feedback from the welding edge(s) 620 impacting an anvil or other receiving surface. Such an approach results is little to no feedback from the welding edge(s) 620 of a sonotrode 600 back through the transducer, thereby eliminating the feedback stress that accelerates system failure in conventional ultrasonic welding techniques.

Figure 7:
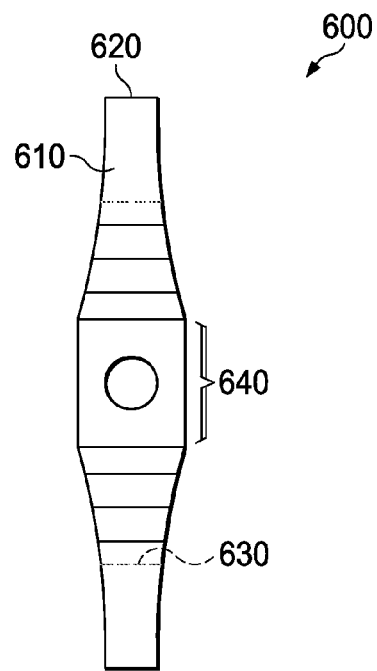
FIG. 7 depicts an end view of the ultrasonic sonotrode illustrated in FIG. 6.

Turning now to FIG. 7, illustrated is an end view of the ultrasonic sonotrode 600 illustrated in FIG. 6. From this end view, a unique profile to the sonotrode 600 can be seen. More specifically, the thickness of the body 610 of the sonotrode 600 is tapered along the second direction from a center portion 640 of the body 610, extending along the first direction D1, to the edges 620 of the body 610. Depending on the embodiment, the tapers along the second direction D2 from the center portion 640 may be linear or they may have a slight radius, as in the illustrated embodiment. By providing such tapers, the concentration of the waves redirected to propagate in the second direction D2 may be concentrated towards the welding surface(s) 620 of the sonotrode 600. Also, in some exemplary embodiments, the center portion 640 of body 610 may be constructed to a uniform thickness along the first direction D1, also as illustrated. In such embodiments, the tapering extends from this flat center portion 640 of uniform thickness to the edges 620 of the sonotrode 600. Alternatively, no tapering of surfaces of the sonotrode 600 need be provided.

Figure 8:
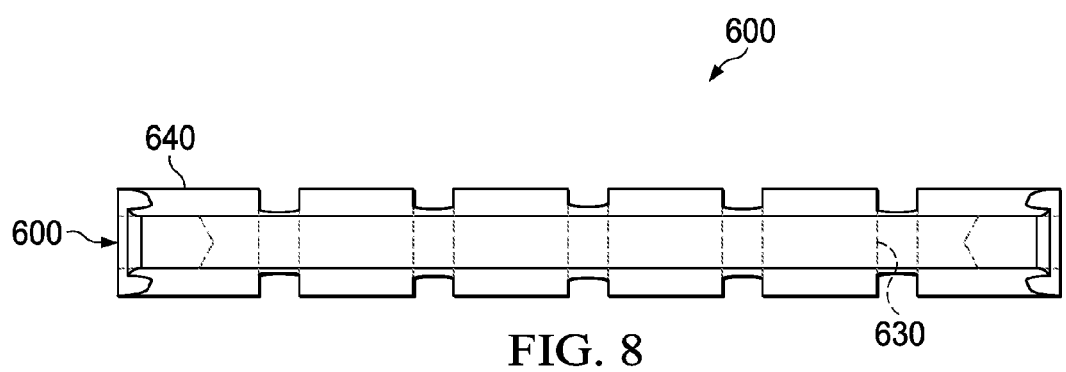
FIG. 8 depicts a side view of the ultrasonic sonotrode illustrated in FIGS. 6 and 7.

Looking now at FIG. 8, depicted is a side view of the ultrasonic sonotrode illustrated in FIGS. 6 and 7. From this side view, the center portion 640 of this embodiment of a sonotrode 600 as disclosed herein may be better seen. Additionally, the uniform widths of the redirecting slots 630 in this embodiment may also be seen. However, as discussed above, such feature sizes and shapes are merely exemplary, and thus the disclosed principles may extend to any sonotrode design and construction, as well as shape and composition, that provides for incoming ultrasonic waves propagating in one direction to be altered to propagate along a second direction such that the sonotrode may be transversely mounted to the transducer assembly generating and providing the ultrasonic waves.

Figure 9:
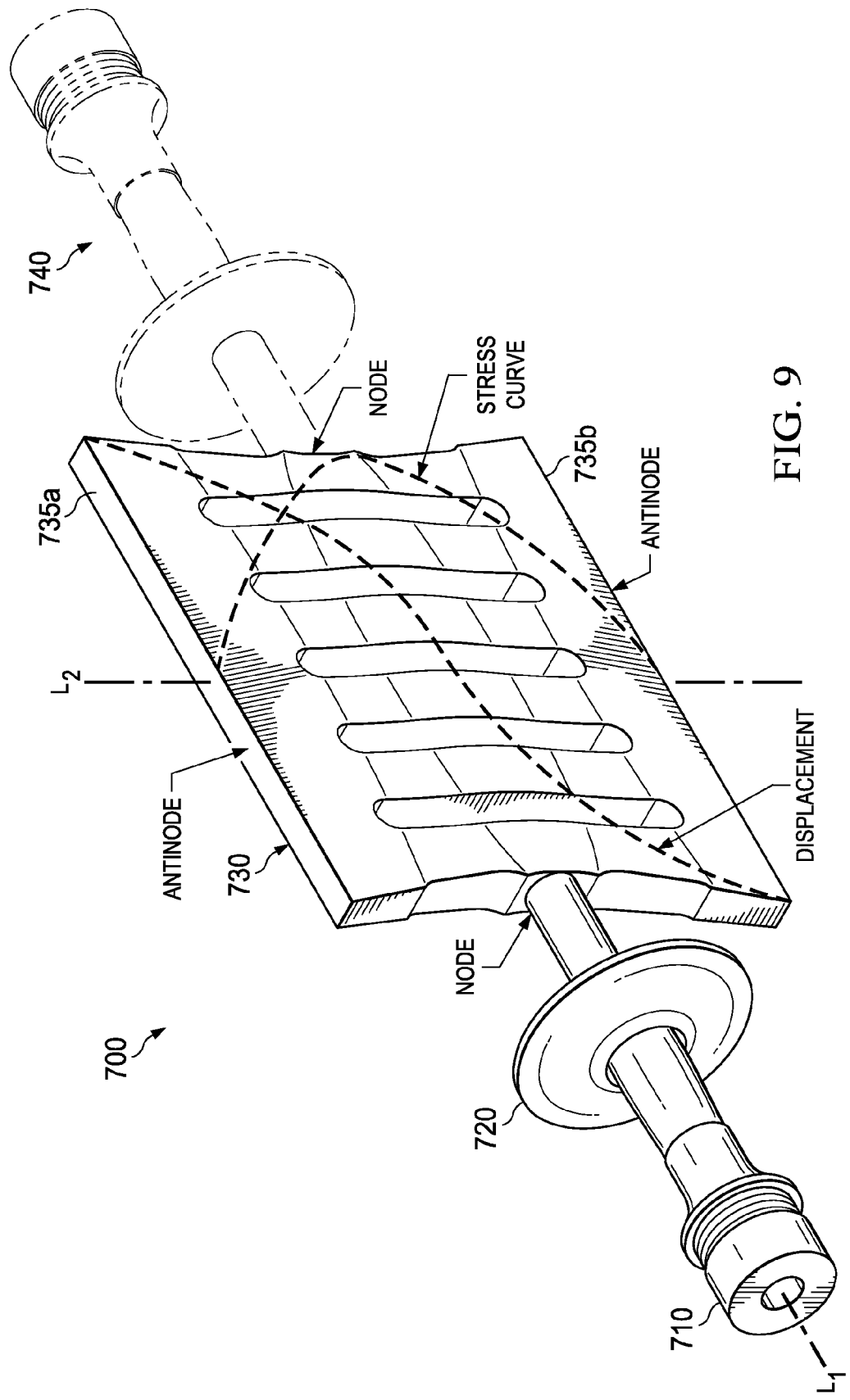
FIG. 9 depicts a perspective view of an ultrasonic welding assembly incorporating an ultrasonic sonotrode constructed in accordance with the disclosed principles.

To illustrate the disclosed principles, FIG. 9 depicts a perspective view of an ultrasonic welding assembly 700 incorporating an ultrasonic sonotrode constructed in accordance with the disclosed principles. As will be discussed in detail below, the output displacement of the unique ultrasonic sonotrode is transverse, or perpendicular, to the input longitudinal displacement of the incoming acoustic waves.

The assembly 700 in FIG. 9 includes a transducer 710, a booster 720, and a sonotrode 730; however, both the construction and the positioning of assembly components differs vastly from conventional approaches. Specifically, the transducer 710 and booster 720 are arranged along the same longitudinal transmission axis $L_1$, but these components are connected to the sonotrode 730 at what may be considered the 'side' of the sonotrode 730. The sides of the sonotrode 730 comprise its nodal regions, as illustrated. Thus, the welding edges 735a, 735b of the sonotrode 730 are arranged along a second transmission axis $L_2$, where the second transmission axis $L_2$ is perpendicular to the first transmission axis $L_1$.

With this innovative arrangement of components, the acoustic waves generated by the transducer 710 and amplified by the booster 720 propagate along a first transmission axis $L_1$, and exit the booster 720 at an anti-nodal point. Those acoustic waves are input to the sonotrode 730 at its nodal region, rather than at an anti-nodal region as followed in conventional approaches. For example, a one-half wavelength ($\lambda/2$) transducer 710 may be rigidly coupled to the nodal position at one-quarter wavelength ($\lambda/4$) of a one-half wavelength ($\lambda/2$) sonotrode 730 for the purpose of generating longitudinal waves transverse to the transducer 710 driving direction via the coupled sonotrode 730. Stated another way, the disclosed principles force resonance at the one-quarter wavelength ($\lambda/4$) of a one-half wavelength ($\lambda/2$) sonotrode 730, which corresponds to the sonotrodes' 730 nodal point. As a result, the expansion/contraction cycle imposed on the nodal position begins to drive the sonotrode 730 in an outward manner, creating a longitudinal displacement of the welding surfaces 735a, 735b of the sonotrode 730 transverse to the original transducer 710 driving direction. This is accomplished by coupling the sonotrode 730 at a one-quarter wavelength ($\lambda/4$) point (illustrated via the displacement line), which is its node rather than anti-node.

A sonotrode 730 constructed in accordance with the disclosed principles is specially designed to facilitate propagation of the input waves along the second, transverse axis $L_2$, and thus output at the anti-nodal welding edges 735a, 735b of the sonotrode 730 for ultrasonic welding applications. The size and geometry of a sonotrode configured to be implemented with the disclosed principles are selected based on the application and amount of displacement that is needed. Moreover, the two welding edges 735a, 735b provided on the sonotrode 730 of FIG. 9 lends itself for use in a rotary welding assembly, such as the assembly 200 illustrated in FIG. 2. In such an application, the first transmission line $L_1$ is not only the input transmission axis for generated acoustic waves, but is also the axis about which the sonotrode 730 may be rotated in such embodiments. Of course, it should be understood that any number of welding edges for a sonotrode as disclosed herein may be provided, and that the disclosed principle are not limited to such rotary applications.

In additional embodiments, a rotary ultrasonic welding assembly 700 like the type illustrated in FIG. 9 may also include a structure 740 coupled on the nodal region of the sonotrode 730 that is opposite the nodal region receiving the transducer/booster components. In some embodiments, the opposing structure 740 may simply be a support structure, similar to an arbor, for offering support to the opposing nodal region of the sonotrode 730. In other embodiments, the opposing structure 740 may be a second transducer and/or booster assembly, which would provide a dual input for the sonotrode 730 along the same input transmission axis $L_1$. In such embodiments, the power supplied to the dual transducers may be halved, with one-half provided to each transducer. Moreover, in dual transducer embodiments, the input of ultrasonic waves from opposing ends of the sonotrode 730 may result in easier uniform waves distribution throughout the sonotrode 730 and thus to the welding surfaces 735a, 735b. In the embodiment illustrated in FIG. 9, the sonotrode 730 has a design and geometry to facilitate uniform waves distribution from a single transducer feeding waves from only one end (i.e., nodal region), but in dual transducer embodiments, the sonotrode 730 may have a different design and geometry based on the opposing ends/inputs where the opposing ends comprise the nodal region of the sonotrode. In all embodiments, however, the disclosed principles in dual transducer embodiments still provide that the stretching and compression of the sonotrode 730 in order to oscillate the welding surfaces 735a, 735b sufficient for ultrasonic welding applications occurs along a transmission axis $L_2$ that is transverse or perpendicular to the input transmission axis $L_1$.

In sum, the conventional technique for ultrasonic welding is to work with a sonotrode's anti-node as the driving location for input acoustic waves. As previously stated, introduction of ultrasonic energy by traditional practice occurs at the anti-node as it is the position for highest displacement but lowest stress. But the disclosed principles teach against conventional practice, and thus ultrasonic energy is introduced at the nodal position (lowest displacement and highest stress) to achieve uniform welding edge displacement even while being subjected to intense working conditions.

The disclosed principles further teach against conventional practice in that with the disclosed principles, ultrasonic energy is introduced transverse (i.e., perpendicular) to the load or vibration direction within the sonotrode. In conventional assemblies, transducers and sonotrodes are arranged along the same transmission line or axis, as discussed above. Unfortunately, as discussed above, this single axis arrangement results in significant vibrational feedback from the sonotrode to the transducer, which typically leads to premature catastrophic assembly failure. The disclosed principles use the nodal position of a sonotrode as a driving location for incoming acoustic waves, which is contrary to conventional practices, in order to "decouple" the transducer from the sonotrode by providing transverse transmission axes. Therefore, a longitudinal wave is produced within the sonotrode oscillating transversely to the input displacement provided along the transducer transmission axis. Stated another way, the decoupling of the output transmission axis $L_2$ from the input transmission axis $L_1$ by transversely aligning the sonotrode anti-nodal regions to the input components allows an assembly in accordance with the disclosed principles to avoid the typically destructive feedback from the welding edges impacting an anvil or other receiving surface. Such an approach results is little to no feedback from the welding edge(s) of a sonotrode back through the transducer, thereby eliminating the feedback stress that accelerates system failure in conventional ultrasonic welding techniques.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

I claim:
1. An ultrasonic sonotrode, comprising:
a body having nodal and anti-nodal regions, and configured to propagate ultrasonic waves received at a nodal region along a first direction;
a plurality of redirecting features formed in the body and configured to cause received ultrasonic waves propagating along the first direction to propagate along a second direction, perpendicular to the first direction, upon encountering one or more of the redirecting features;
wherein the body is further configured to stretch and compress along the second direction based on corresponding peaks and valleys of the waves propagating along the second direction; and
at least one ultrasonic welding surface at an anti-nodal region of the body configured to oscillate based on the stretching and compressing, wherein opposing ends of the sonotrode comprise the nodal region, at least one of the opposing ends configured to receive the ultrasonic waves.

2. An ultrasonic sonotrode in accordance with claim 1, wherein the body comprises an elongated structure having anti-nodal regions along long sides, and nodal regions along short sides, of the elongated structure.

3. An ultrasonic sonotrode in accordance with claim 1, wherein the redirecting features comprise elongated slots formed through the body and extending along the second direction.

4. An ultrasonic sonotrode in accordance with claim 3, wherein the elongated slots are substantially equally spaced across the body.

5. An ultrasonic sonotrode in accordance with claim 3, wherein the elongated slots each comprises substantially equal widths along each slot length.

6. An ultrasonic sonotrode in accordance with claim 3, wherein the elongated slots comprise varying lengths.

7. An ultrasonic sonotrode in accordance with claim 6, wherein the length of elongated slots closer to the ends of the body are greater than lengths of elongated slots further from the ends of the body.

8. An ultrasonic sonotrode in accordance with claim 1, wherein a thickness of the body is tapered along the second direction from a center portion of the body, extending along the first direction, to edges of the body.

9. An ultrasonic sonotrode in accordance with claim 8, wherein the edges of the body each comprise anti-nodal regions of the body having substantially uniform thickness along their lengths, at least one of the anti-nodal regions comprising the at least one welding surface.

10. An ultrasonic sonotrode in accordance with claim 8, wherein the center portion of body comprises a uniform thickness along the first direction, the tapering extending from the center portion of uniform thickness to the edges.

11. A method of manufacturing an ultrasonic sonotrode, the method comprising:
forming a body with nodal and anti-nodal regions, the body configured to propagate ultrasonic waves received at a nodal region along a first direction, and comprising at least one ultrasonic welding surface at an anti-nodal region; and
forming a plurality of redirecting features in the body, the redirecting features configured to cause received ultrasonic waves propagating along the first direction to propagate along a second direction, perpendicular to the first direction, upon encountering one or more of the redirecting features;

wherein the body is further configured to stretch and compress along the second direction based on corresponding peaks and valleys of the waves propagating along the second direction thereby oscillating the at least one welding surface based on the stretching and compressing, and wherein forming the body further comprises forming opposing ends of the body as the nodal region, at least one of the opposing ends configured to receive the ultrasonic waves.

12. A method in accordance with claim 11, wherein forming the body further comprises forming the as an elongated structure having anti-nodal regions along long sides, and nodal regions along short sides, of the elongated structure.

13. A method in accordance with claim 11, wherein forming a plurality of redirecting features comprises forming elongated slots through the body and extending along the second direction.

14. A method in accordance with claim 13, wherein forming the elongated slots further comprises forming the elongated slots substantially equally spaced across the body.

15. A method in accordance with claim 13, wherein forming the elongated slots further comprises forming the elongated slots having substantially equal widths along each slot length.

16. A method in accordance with claim 13, wherein forming the elongated slots further comprises forming the elongated slots to varying lengths.

17. A method in accordance with claim 16, wherein the length of elongated slots closer to the ends of the body are greater than lengths of elongated slots further from the ends of the body.

18. A method in accordance with claim 11, wherein forming the body further comprises tapering a thickness of the body along the second direction from a center portion of the body, extending along the first direction, to edges of the body.

19. A method in accordance with claim 18, wherein forming the body further comprises forming edges of the body as anti-nodal regions having substantially uniform thickness along their lengths, at least one of the anti-nodal regions comprising the at least one welding surface.

20. A method in accordance with claim 18, wherein forming the body further comprises forming the center portion at a uniform thickness along the first direction, the tapering extending from the center portion of uniform thickness to the edges.

* * * * *